Oct. 2, 1962

W. J. ZENNER 3,056,546

INTELLIGENCE RECORDING APPARATUS

Filed May 7, 1959

3 Sheets-Sheet 1

INVENTOR
WALTER J. ZENNER

BY R. C. Terry

ATTORNEY

Oct. 2, 1962 W. J. ZENNER 3,056,546

INTELLIGENCE RECORDING APPARATUS

Filed May 7, 1959 3 Sheets-Sheet 2

INVENTOR
WALTER J. ZENNER

BY R. C. Terry
ATTORNEY

Oct. 2, 1962 W. J. ZENNER 3,056,546

INTELLIGENCE RECORDING APPARATUS

Filed May 7, 1959 3 Sheets-Sheet 3

INVENTOR
WALTER J. ZENNER

BY R. C. Terry

ATTORNEY 3,056,546
INTELLIGENCE RECORDING APPARATUS
Walter J. Zenner, Des Plaines, Ill., assignor to Teletype Corporation, Chicago, Ill., a corporation of Delaware
Filed May 7, 1959, Ser. No. 811,714
7 Claims. (Cl. 234—109)

This invention relates to intelligence recording apparatus and more particularly to a multi-magnet perforating apparatus for preparing control tapes for use in printing telegraph and like systems.

In the broad field of communications, such as printing telegraph and data processing, control tapes are used to receive and store information usually in the form of perforations representing permutation codes. In this field, high speed transmitters of information have been developed and heretofore a limiting factor in the use of high speed transmitters and kindred apparatus, has been the lack of receiving mechanisms which are capable of recording the transmitted data in a permanent manner as opposed to mechanisms for storing the information received temporarily in electronic devices. In other words, the utilization of high speed mechanisms has been retarded by lack of suitable mechanism such as printers or recorders capable of operation at speeds comparable to the speed at which information can be transmitted.

It is an object of the present invention to provide a simple and reliably operable mechanism for recording intelligence transmitted to the apparatus at very high speeds.

Another object of the invention is the provision of a tape perforator for recording intelligence at any speed up to a maximum which is relatively higher than has been possible heretofore.

A still further object of the invention is to provide a tape perforator which is limited in its speed of operation only by the natural frequency of vibration of vibratory reeds used in it.

In accordance with a prefered embodiment of the invention, a plurality of vibratory reeds are utilized to furnish the energy for actuating punches individual to them and for controlling the feeding of tape to the perforating punches. In the present embodiment of the invention, a plurality of punches are provided which are pivotally connected to a plurality of vibratory reeds. Each reed has individual to it, an electromagnet and each reed comprises the armature of the electromagnet with which it is associated. When current is supplied to a magnet to energize it, it will attract its associated reed from a neutral position to a stressed position and as long as the electromagnet is energized, the reed will be held attracted to the core of the magnet. Upon release of the reed, it will tend to return to its neutral position and in so doing, will vibrate to a point beyond its neutral position due to the energy stored in the reed. As a reed is released, it will drive its associated punch through a tape. One of the reeds of the plurality of reeds serves to control a tape feed mechanism for feeding tape past the perforators and also to perforate a feed hole in the tape.

As a reed is released by its associated electromagnet, the reed's potential energy is converted to kinetic energy until its associated punch strikes the tape at a point just beyond the reed's neutral position where part of the kinetic energy is dissipated in effecting the punching operation. However, the reed retains sufficient kinetic energy to continue its movement beyond its neutral position and in a succeeding portion of the cycle of its vibration, the reed will move back toward the core of its associated electromagnet. If the magnet has been re-energized, it will attract the reed and hold the reed until the magnet is again de-energized. Thus the upper limit of speed of the apparatus is the same as the natural frequency of vibration of the reeds.

A more complete understanding of the invention may be had by reference to the following detailed description when considered in conjunction with the accompanying drawings wherein.

Figure 1:
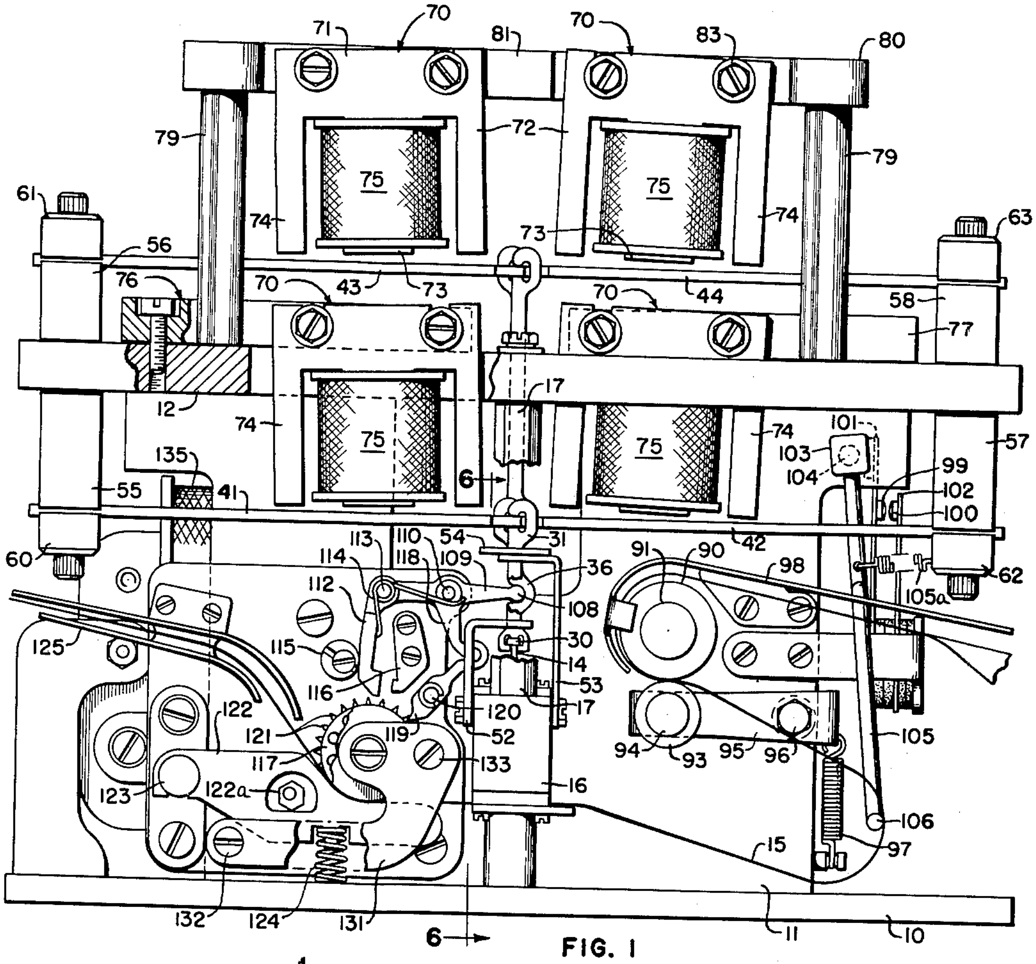
FIG. 1 is a front elevational view of a tape perforator comprising a preferred embodiment of the invention, parts being broken away to illustrate more clearly, certain features of the structure.
Figure 6:
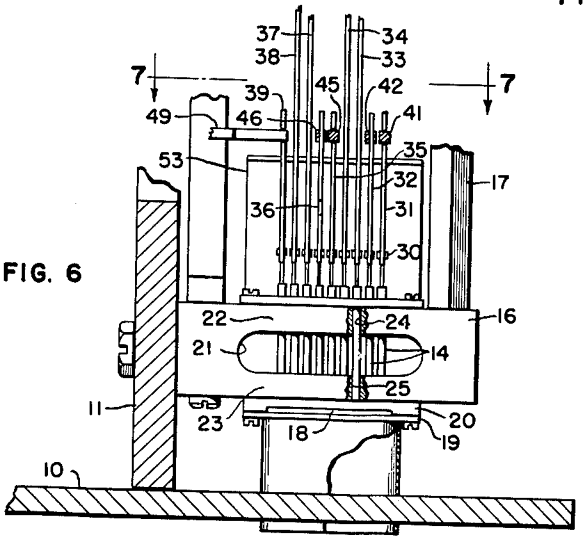
FIG. 6 is an irregular fragmentary sectional view taken substantially along the line 6—6 of FIG. 1 in the direction of the arrows and showing some details of the punches and associated apparatus.
Figure 7:
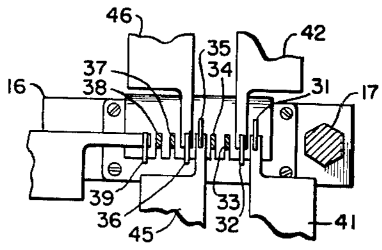
FIG. 7 is a fragmentary sectional view taken substantially along the line 7—7 of FIG. 6 to illustrate the manner in which some of the vibratory reeds are connected to their associated punches.
Figures 2, 9:
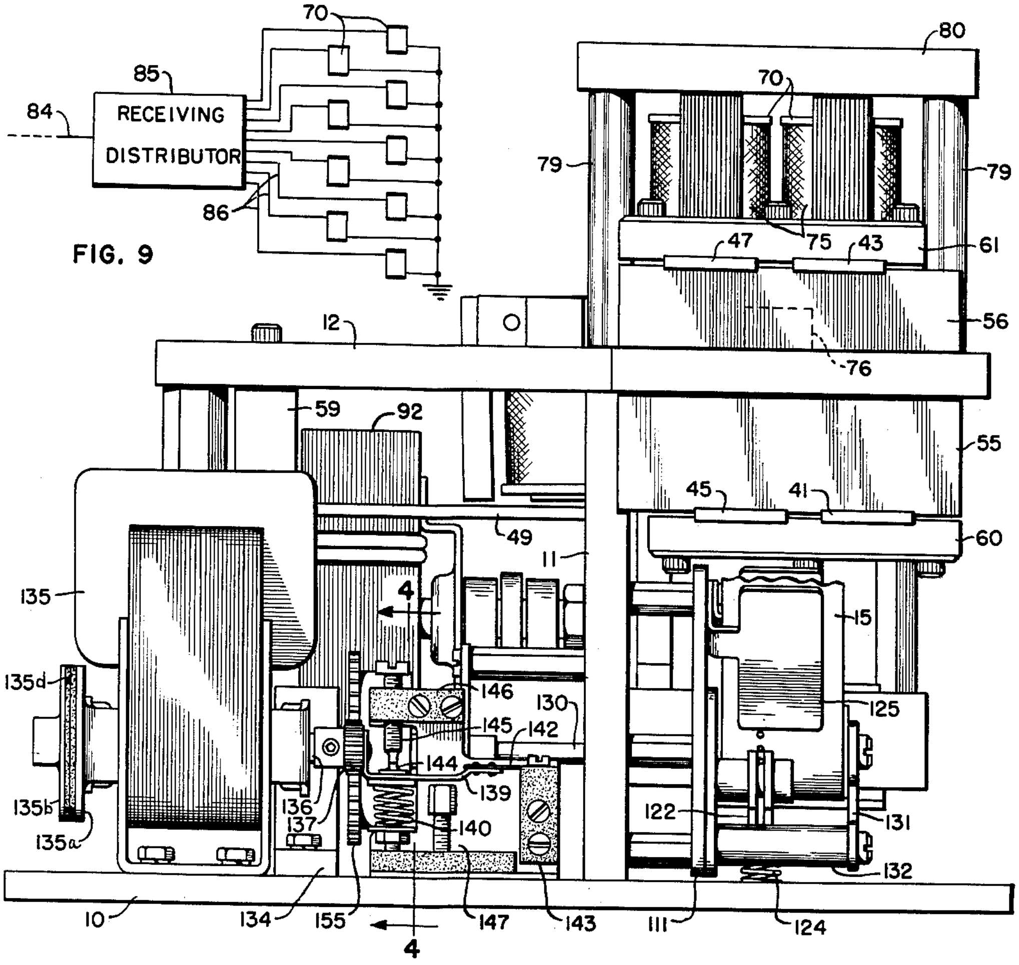
FIG. 2 is an end elevational view of the left end of the apparatus illustrated in FIG. 1.
FIG. 9 is a schematic diagram showing one way in which the apparatus may be connected to a telegraph line.
Figure 3:
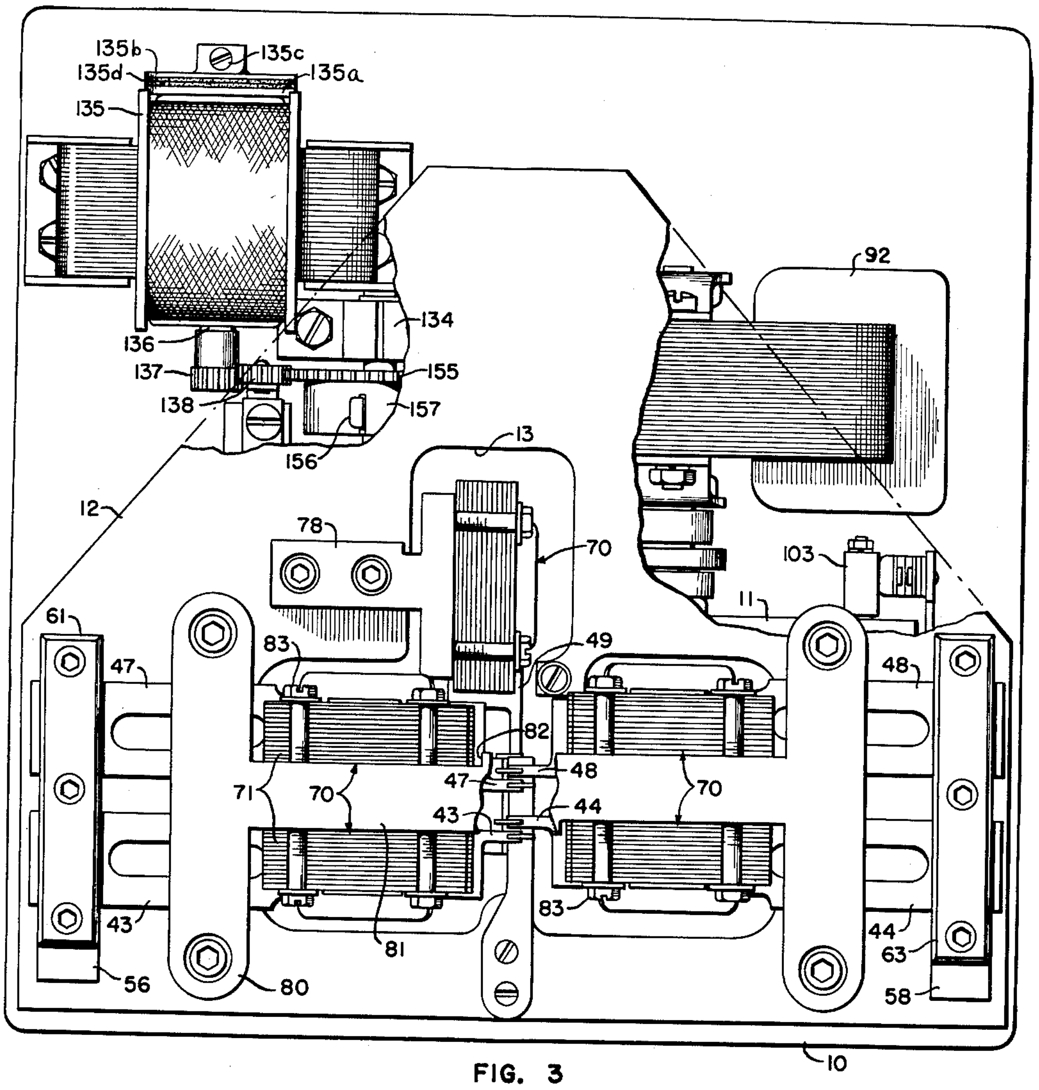
FIG. 3 is a top plan view of the apparatus illustrated in FIGS. 1 and 2, parts being broken away, more clearly to illustrate some of the parts of the apparatus positioned beneath them.

Referring now to the drawing wherein like reference characters designate the same parts throughout the several views, particular reference being had to FIGS. 1, 2 and 6, it will be seen that the apparatus is mounted on a base 10 having extending upwardly from it a vertically extending main support member 11. The main vertical support member 11 has fixed to its upper edge, a main support plate 12 which, as shown in FIG. 3, is provided with an irregularly shaped cutout 13. A plurality of punches 14 are provided for perforating code holes and feed holes in a tape 15. These punches 14 are mounted for reciprocation in a punch block 16 which is rigidly mounted on the vertically extending support member 11 at the rear end of the punch block and is supported by a post 17 fixed to the under side of the main support plate 12 and to the upper surface of the punch block 16 at the forward end of the punch block. The tape to be perforated in the apparatus is fed through a tape slot 18 formed by a die plate 19 and a punch guide plate 20 both fixed to the under side of the punch block 16. The punch block 16 has a cutout 21 formed in it to define upper and lower guide portions 22 and 23 in which there are formed punch guiding apertures 24 and 25, respectively, in which the punches 14 may be reciprocated to perforate holes in the tape 15.

In the present apparatus, there are nine punches provided, eight of which are utilized for punching code perforations in the tape 15 and the ninth one of which is utilized for perforating a feed hole perforation in the tape. Each of the punches 14 is provided with a head 30 which is designed to be received within a recess formed in the lower portion of a link individual to it, there being nine links designated 31 to 39 for actuating the eight code punches and the feed hole punch. As will be seen by reference to FIG. 1, each of the links 31 to 39 has a recess formed in it for receiving the head 30 of a punch 14 associated with it whereby, upon reciprocation being imparted to any one of the links 31 to 39, the punch associated with it will be moved downwardly and upwardly with the link.

The upper ends of the links 31 to 39 are provided with recesses for receiving the reduced end portions of reeds or bars 41 to 49, respectively. The five links 31, 32, 35, 36 and 39 are relatively short, as illustrated in FIG. 6 and the four links 33, 34, 37 and 38 are relatively long, since the reeds 41, 42, 45, 46 and 49 which serve to actuate the links 31, 32, 35 and 39, respectively, are positioned at a different level in the apparatus than the reeds 43, 44, 47 and 48 which serve to actuate the links 33, 34, 37 and 38, respectively.

The punch block 16 has a lower guide bracket 52 attached to it for guiding the lower ends of the links 31 to 39, the bracket 52 being provided with suitable slots for receiving the shank portions of the links 31 to 39. The punch block 16 also has an upper guide bracket 53 fixed to it which is provided with slots for receiving the upper portions of the links 31 to 39 and the bracket 53 has a slotted retainer plate 54 fixed to it for cooperation with the bracket 53 to guide links 31 to 39 and hold them in operative association with their respective reeds and punches.

The reeds 41 to 49 are supported on reed supporting blocks 55 to 59, respectively, which are fixed to the main supporting plate 12. The reed supporting blocks 55, 57 and 59 are suitably fixed to the under side of the main support plate 12 whereas the reed supporting blocks 56 and 58 are suitably fixed to the upper surface of the main support plate 12. The reeds 41 and 45 have their outer ends tightly clamped to the reed supporting block 55 by a clamping bar 60 and the reeds 43 and 47 are rigidly attached to the clamping block 56 by a clamping bar 61. The reed 49 is similarly fixed to the reed supporting block 59 of substantially the same construction as the block 55. The reeds 42 and 46 each have one end rigidly fixed to the reed supporting block 57 by a clamping bar 62 and the reeds 44 and 48 each have one end rigidly fixed to the reed supporting block 58 by a clamping bar 63. As pointed out hereinbefore, the inner ends of all of these reeds are engaged in the recesses of their respective links 31 to 39.

Each of the reeds 41 to 49 has an electromagnet 70 individual to it, and each of the electromagnets 70 comprises a laminated core 71 (FIG. 1) having three legs 72, 73 and 74, with a coil 75 on the central leg 73. The electromagnets 70 associated with the reeds 41 and 45 are mounted on opposite sides of a support bar 76 rigidly mounted on the main support plate 12, the electromagnets 70 associated with the reeds 42 and 46 are similarly mounted on opposite sides of a support bar 77 fixed to the main support plate 12 and the electromagnet 70 associated with the reed 49 is mounted on a T-shaped support member 78 suitably fixed to the main support plate 12. A framework for supporting the upper electromagnets 70 associated with the reeds 43, 44, 47 and 48 comprises four posts 79 extending upwardly from the main support plate 12 and carrying a substantially H-shaped magnet supporting member 80, the cross portion 81 of which has the electromagnets 70 associated with the reeds 43 and 44 mounted on its front face and the electromagnets 70 associated with the reeds 47 and 48 mounted on its rear face. The cross portion 81 has an offset 82 in it properly to align the cores 71 of the electromagnets 70 with their respective reeds.

The electromagnets 70 are mounted on their respective support members by means of machine screws 83 which extend through the laminations of the cores 71 and are threaded into the respective support members, for the electromagnets. Each of the electromagnets 70 is positioned on its respective support member at a slight angle to the horizontal thereby to reduce the air gap between the associated reeds 41 to 49 and the outer legs 74 of the cores 71 of the electromagnets whereby flexure of the reeds is facilitated and whereby when any one of the reeds 41 to 49 is attracted to its associated electromagnet 70, the flexure of the reed may take place throughout a substantial portion of its length to impart the greatest possible motion to the links 31 to 39 associated with the reeds 41 to 49.

The electromagnets 70 may be controlled from any suitable signal source, such for example as a telegraph line 84 (FIG. 9), over which signals may be directed to a receiving distributor 85 of the general type disclosed in United States patents, Nos. 2,609,444 and 2,609,445 to R. D. Slayton. In this distributor, the incoming signals may be received serially and any marking (current) or spacing (no current) signals received may be translated into parallel circuits of oposite polarity to the line signals and applied to output leads 86 extending from the distributor 85 to the electromagnets 70.

The tape 15 to be perforated in the apparatus is advanced to the punch block 16 by a feed roller 90 mounted on a shaft 91 suitably journalled in the main support plate 12 and driven by a shaded pole motor 92 mounted on the base 10. The tape 15 is held in engagement with the feed roller 90 by an idler roller 93 freely rotatable on a stud shaft 94 fixed to a lever 95. The lever 95 is urged to rock in a clockwise direction about a pivot shaft 96 fixed to the vertically extending supporting member 11, by a tension spring 97. A guide bracket 98 fixed to the vertically extending supporting member 11 serves to guide the tape 15 around the feed roller 90 and into the bite between the feed roller 90 and idler roller 93.

Current for actuating the motor 92 is supplied to the motor through a pair of contacts 99 and 100 mounted on contact springs 101 and 102, respectively. The contact spring 101 is normally biased to a position to hold the contacts 99 and 100 open but may be moved to a position to make contact between the contacts 99 and 100 by a cam 103 mounted on the rear end of a shaft 104 when a lever 105 is rocked in a clockwise direction out of engagement with a stop (not shown) against which it is normally held by spring 105*a*, which yields to permit the clockwise movement of lever 105. The lever 105 is fixed on the shaft 104 and has a bent portion 106 at its lower end (FIG. 1 over which the tape 15 passes after the tape has passed betwen the idler roller 93 and feed roller 90 in its path to the punch block 16. With this construction, as tape is used up in the punching mechanism and drawn through punch block 16, in a manner to be described, the tape will be drawn taut between the punch block 16 and rollers 93 and 90 and consequently, will rock the lever 105 clockwise to move contact 99 into engagement with the contact 100 thereby to supply operating current to the motor 92 to advance the tape 15 toward the punch block. Thus, there will always be a supply of un-tensioned tape presented to the punching block 16.

The punch actuating links 31 to 35 and 37 to 39 all have straight shank portions whereas the link 36 which actuates the feed hole punch 14 has a curve formed in it to form a socket or recess 108 (FIG. 1) into which the rounded end of a lever 109 extends. The lever 109 is pivoted on a pivot stud 110 and controls the feeding of tape through the punch block 16. The pivot stud 110 is mounted on an escapement supporting plate 111 which is mounted on the vertically extending supporting member 11 in spaced relation thereto. The left end of the lever 109 (FIG. 1) has a pawl 112 pivotally mounted thereon and normally urged to rock in a clockwise direction about its pivot stud 113 by a spring 114. An eccentrically adjustable stop 115 mounted on the plate 111 limits the movement of pawl 112 in a clockwise direction and a stop 116 also mounted on the plate 111 limits the movement of the pawl 112 in a counterclockwise direction when the pawl is moved by a feed wheel 117. The lever 109 has a downwardly projecting arm 118, the free end of which is rounded and extends into a recess in the upper end of a stop pawl 119 that is mounted for oscillation and reciprocation with respect to a stud 120 extending outwardly from the plate 111.

In the various figures of the drawings, the apparatus is illustrated as it would be before current is connected to the electromagnets 70. It will be understood that as soon as the apparatus is put into use all of the electromagnets 70 will be energized and held energized preparatory to the receipt of signals whereupon they will be selectively de-energized to effect perforations in the tape 15. Consequently, the stop pawl 119 is shown in engagement with a tooth 121 on the feed wheel 117 and is thereby blocking rotation of the feed wheel 117 and consequently, prevents the feeding of tape 15 through the punch block 16. In the operation of the apparatus, fed holes are perforated in the tape 15 by the punch 14 associated with the reed 46 and these feed holes are engaged by the teeth 121 on the feed wheel 117, the tape being held in engagement with the feed wheel by a spring pressed guide member 122 which is pivotally mounted on a pivot shaft 123 extending forwardly from the plate 111. The guide member 122 has its free end shaped to conform to a portion of the circumference of the feed wheel 117 and the guide member 122 is urged in a counterclockwise direction against adjustable eccentric stop 122*a* by a compression spring 124 interposed between the base 10 and a portion of the guide member 122 thus to hold the tape 115 in engagement with the feed wheel 117 to facilitate the feeding of tape by the feed wheel. The plate 111 also supports a tape guide bracket 125 which guides the tape out of the apparatus after it has been perforated.

The feed wheel 117 is fixed to a shaft 130, the forward end of which is journalled in a bracket 131 that is supported on the plate 111 and in spaced relation thereto. This bracket 131 is carried at the front of the apparatus being mounted on a pair of posts 132 and 133 that extend forward from the front face of the plate 111, thus the bracket 131 supports the front end of the shaft 130. The rear end of the shaft 130 is supported in a bearing block 134 which extends upwardly from the base 10 and the shaft is designed to be driven by a motor 135 suitably mounted on the base 10. The motor 135 drives a shaft 136 carrying a gear 137 that meshes with an idler gear 138. The idler gear 138 is mounted on the upturned end of a spring supported bracket 139 that is urged to the position shown in FIGS. 2 and 4 by a compression spring 140 adjustably mounted on the base 10 by means of an adjustment screw 141. The end of the bracket 139 removed from the up-turned end thereof is connected through a leaf spring 142 to a supporting insulating block 143.

Figure 4:
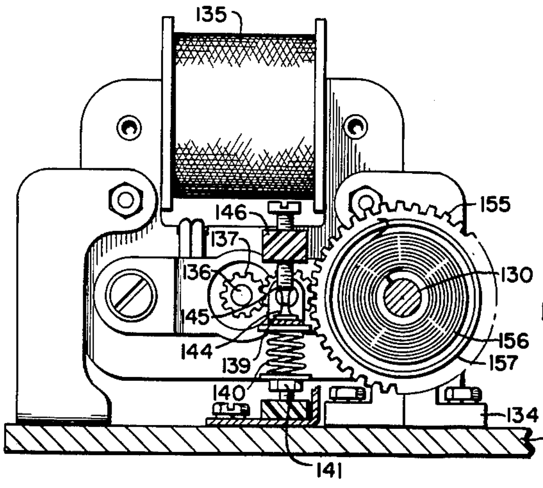
FIG. 4 is a fragmentary sectional view taken substantially along line 4—4 of FIG. 2 in the direction of the arrows showing some details of the mechanism for advancing tape through the apparatus.
Figure 5:
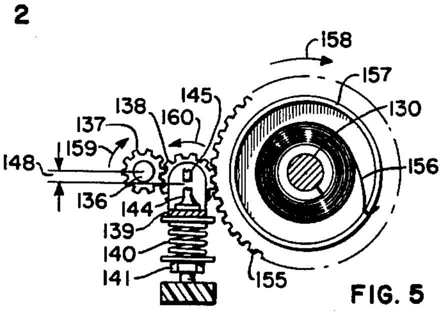
FIG. 5 is a fragmentary view of a portion of the apparatus shown in FIG. 4 showing some of the apparatus shown in FIG. 4 in a different operative position than shown in FIG. 4.

The bracket 139 carries a contact 144 which, as shown in FIGS. 2 and 4, is in engagement with an adjustable contact 145 carried by an insulating block 146 supported on a plate 147. As shown in FIGS. 2 and 4, the contacts 144 and 145 are in engagement and these contacts, when closed, serve to supply operating current to the motor 135. As shown in FIG. 5, the contacts 144 and 145 are not in contact, one with the other, due to the fact that the idler gear 138 has been displaced downwardly the amount indicated by the arrows at 148 and their associated centerlines. Meshing with the idler gear 138 is a gear 155 which is rotatable about the shaft 130 and is connected to the shaft 130 by a coil spring 156 that it attached to a drum 157 that is in turn fixed to the gear 155 and attached to the shaft 130. The coil spring 156 is contained within the drum 157 and tends to apply a torque to the shaft 130 in the direction indicated by the arrow 158. The gear 137 is driven by the motor 135 in the direction indicated by the arrow 159 and tends to drive the idler gear 138 in the direction indicated by the arrow 160, thus, to drive the gear 155 in the direction of the arrow 158 and consequently rotate the shaft 130 through the action of the spring 156. As the coil spring 156 is wound up, it will tend to drive the feed wheel 117 but if either the pawl 112 or the pawl 119 is in engagement with a tooth 121, the shaft 130 and feed wheel 117 will be held stationary. When the shaft 130 is held stationary, the driving force imparted to the gear 137 will tend to rotate the idler gear 138 but since the gear 155 offers an increasing resistance to rotation as the tension in the spring is increased, the idler gear 138 will be pushed downwardly by gear 137, rolling against gear 155, to the position shown in FIG. 5, thus to open the contact pair 144—145. The contacts 144 and 145 are connected in the circuit to the motor 135 and consequently, when they are opened, no power will be supplied to the motor 135. However, a turning torque will be continuously applied to the shaft 130 tending to rotate it. Thus, as soon as the escapement mechanism, including the pawls 112 and 119, is operated, the shaft 130 will be permitted to rotate step by step until the energy stored in the spring 156 has been expended and then the contacts 144 and 145 will be permitted to close under the influence of spring 140, thus to supply current again to the motor 135.

The frame of motor 135 has secured thereto a disc 135*a* mounted coaxially of motor shaft 136. Shaft 136 carries at the end opposite to that on which gear 134 is mounted a disc 135*b* of substantially the same diameter as disc 135*a*. Disc 135*b* is secured to shaft 136 by set screw 135*c*. A friction disc 135*d* is disposed between stationary disc 135*a* and rotatable disc 135*b*. A light compression spring (not shown) disposed between the support for stationary disc *a* and the armature of the motor urges the armature rightwardly as viewed in FIG. 2 to establish frictional engagement between disc 135*a*, 135*b* and 135*d*. When motor control contacts 144 and 145 are open and the motor is stopped the discs 135*a*, 135*b* and 135*d* form a friction brake to prevent reverse rotation of the motor shaft under the influence of spring 140 tending to raise gear 138 by imparting counterclockwise rotation to gear 137 as viewed in FIG. 5. When motor control contacts 144 and 145 close, the magnetic force generated by the field winding of the motor moves the armature of the motor axially a short distance to pull the armature into alignment with the field core of the motor. This movement is sufficient to reduce the frictional engagement between discs 135*a*, 135*b* and 135*d* to permit free rotation of the armature. Were it not for this brake the spring 140 would tend to lift gear 138 by imparting counterclockwise rotation to gear 137, as viewed in FIG. 5, until the contacts 144 and 145 had closed whereupon the motor would drive the gear 138 downwardly to cause opening of the contacts, thus giving rise to repetitious opening and closing of the contacts.

*Operation*

In the operation of the apparatus, punching is effected upon the release of any or all of the electromagnets 70. In each cycle of operation, the electromagnet 70 associated with the reed 46 and link 36 is released to effect tape feeding and to effect the perforation of the tape feed hole in the tape 15. The electromagnets 70 may be energized and de-energized by any suitable high speed distributor or transmitter mechanism. When current is applied to any one of the magnets, the reed 41 to 49 associated with that magnet 70, will be attracted from its neutral position as shown in the drawings into engagement with the legs 72, 73 and 74 of the laminated core 71 of the energized electromagnet. When all of the reeds 41 to 49 are attracted to their respective electromagnets 70, the apparatus will be absolutely silent since neither the motor 135 nor the motor 92 will be running and in this quiescent state the apparatus is conditioned to receive intelligence transmitted to it from any suitable source. Upon the release of any one of the electromagnets 70, the reed 41 to 49 associated with that electromagnet will also be released and will supply energy for punching holes in the tape and for controlling the tape feed mechanism. When the reeds are attracted to their associated electromagnets, they will be bent upward from the neutral position, as shown, due to their attraction to the core 71 of their associated electromagnet.

Figure 8:
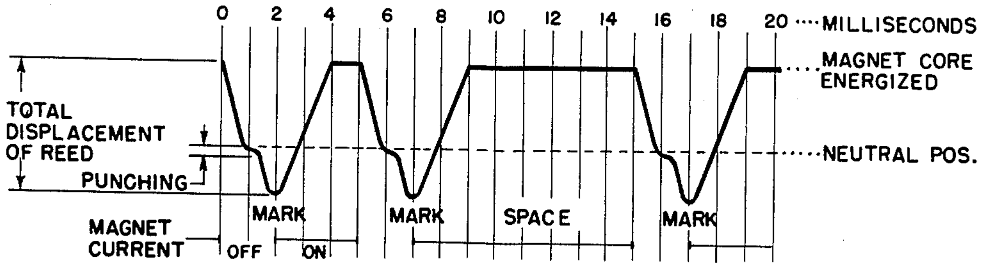
FIG. 8 is a timing chart showing the utilization of the natural frequency of vibration of the reeds.

By reference to the timing diagram FIG. 8, it will be seen that as soon as an electromagnet 70 releases its associated reed, the reed will start a cycle of vibration. In the first quarter of the reed's cycle, the potential energy of the reed is converted into kinetic energy until its associated punch 14 strikes the tape 15, which is approximately at the reed's neutral position, where part of the kinetic energy will be dissipated in effecting the punching operation. The reed of the group of reeds 41 to 49 which has been released is slowed down during the punching operation but retains sufficient kinetic energy to continue its movement through the second quarter of its cycle to the end of its vibratory movement. In the third quarter of its cycle, the reed will be moving upward toward its neutral position and at this time, current supplied to the electromagnet 70, which has been released, will attract the reed toward its core 71, so that as the reed, which has been released, approaches the magnet core in the third quarter of its cycle of vibration, the magnetic force of the electromagnet 70 will be sufficient to again attract the reed to the core of the magnet and store in it the energy which was lost in the punching cycle. Any reed 41 to 49 which had been released by its associated electromagnet 70 will thus be restored to its stressed position where it will have stored in it the same potential energy that it had at the beginning of its cycle of vibration.

In the apparatus shown herein, the reeds were so designed as to complete one cycle of vibration in four milli-seconds as indicated in the timing diagram FIG. 8. One milli-second is alloted as a margin for voltage variations or other variables which might effect the vibration cycle time. Therefore, a minimum of 5 milli-seconds is allowed for the punching of each character. Any amount of time may elapse between the punching of successive characters since the punching takes place upon the de-energization of an electromagnet 70. Consequently, a perforator of the type shown herein is capable of operation at any speed up to 12,000 characters or an average of 2,000 words per minute.

As stated hereinbefore, the electromagnet 70, associated with the reed 46 and through it with the link 36 which drives the feed hole punch 14, is de-energized each time any one of the code controlling electromagnets 70 is de-energized. The reed 46 which drives the punch 14 for perforating the feed hole in the tape 15 also controls the tape feeding mechanism including the pawls 112 and 119. The pawls 112 and 119 form an escapement mechanism, the pawl 112 serving to block movement of the tape feed wheel 117 by engaging a tooth 121 on the feed wheel 117 when the reed 46 associated with the link 36 is held attracted by its associated electromagnet 70. When the reed 46 is released from its magnet core 71, it actuates the link 36 to rock the lever 109 clockwise about the pivot stud 110 thereby to slide the pawl 119 into engagement with a tooth 121 on the feed wheel 117 and to move the pawl 112 up out of the path of a tooth 121 on the feed wheel 117. The pawls 112 and 119 will then occupy substantially the position shown in FIG. 1 where pawl 119 is blocking rotation of the feed wheel 117 and the pawl 112 has been rocked by the spring 114 into engagement with stop 115.

As the reed 46, in the third and fourth quarters of its cycle of vibration, moves back to engagement with the core 71 of its electromagnet 70, it will move the link 36 upwardly and consequently the lever 109 will be rocked counterclockwise. When the lever 109 is rocked counterclockwise, it will move the pawl 112 down into the path of a tooth 121 just before the pawl 119 releases the tooth 121 with which it had been engaged. The pawl 119 will move upwardly when the lever 109 is rocked counterclockwise to release the feed wheel 117 for rotation and the feed wheel will thereupon move one step.

Since the pawl 112 is at this time in the path of a tooth 121, the pawl 112 will be rocked by the tooth in a counterclockwise direction about its pivot stud 113 until it engages stop 116. This will permit the feed wheel 117 to move one step to advance the tape 15 one step and present a new section of tape to the punches 14.

As the tape 15 is fed forward step by step by the feed wheel 117 the slack in the tape between the bent portion 106 of lever 105 will be taken up until the tape 15 rocks the lever 105 counterclockwise which will move contact 99 into engagement with contact 100 to supply operating current to motor 92. When motor 92 is operated, it will cause tape to be fed toward the punch block 16 so that there will be an untensioned supply of tape 15 presented to the block 16 at all times thereby reducing the load on the tape feed wheel 117.

Although a specific embodiment of the invention has been described hereinbefore, it should be understood that numerous variations thereof may be employed without departing from the invention.

What is claimed is:

1. In a tape perforator having perforating punches, a tape feed mechanism including a tape feed wheel having teeth on it for engaging in apertures in a tape, an oscillatable escapement device operable with one of said punches comprising a pair of pawls alternately engageable with the teeth on the feed wheel to release the feed wheel for one step of movement for each oscillation of the escapement device, a shaft connected to said feed wheel, a first gear rotatable on said shaft, spring means interconnecting said first shaft and said gear and tending to drive said shaft with said first gear, a motor, a pair of contacts for supplying operating current to said motor, a gear driven by said motor, an idler gear interconnecting said motor-driven gear and said first gear, a bracket for supporting said idler gear, and a spring for normally holding said bracket in a position to maintain said idler gear in a predetermined position with respect to the motor-driven gear and said first gear and to maintain said contact pair closed, said bracket being movable out of said position by the action of said motor-driven gear on said idler gear when the feed wheel is blocked by either of said pawls.

2. A perforator for punching permutation code perforations and tape feed holes in tape comprising a punch block, a plurality of punches slidably mounted for reciprocation in said punch block, means for intermittently feeding tape through said punch block, a link individual to each punch, a plurality of metal reed springs in the form of bars at least the end portions of which are of a magnetic material and which have a predetermined natural frequency of vibration, one of said bars being connected to each one of said links for actuating said links, a plurality of electromagnets, one individual to each bar, a framework for supporting said electromagnets, means on said framework for rigidly holding the ends of said bars remote from their point of connection to the links and for holding said bars in proximity to their associated electromagnets, said bars forming the armatures of said electromagnets whereby upon energization of an electromagnet its associated bar will have the end of it, to which the link is connected, attracted to its electromagnet and bent to a stressed condition within its elastic limits to store potential energy in the bar which upon release of the electromagnet is converted into kinetic energy for initiating a single cycle of vibration of the bar at the natural frequency thereof, means selectively operated for deenergizing and re-energizing said electromagnets within one cycle of vibration of their bars at the natural frequency of the bars, an escapement mechanism forming part of said tape feed actuated by one of said links upon release and restressing of the bar associated with that link, a tape feed wheel controlled by said escapement mechanism for causing step-by-step movement of said tape, said escapement mechanism being operated to release the feed wheel for one step of movement when the electromagnet associated with its link is energized, and means cooperating with said escapement mechanism tending to drive said feed wheel continuously.

3. A tape perforator comprising a reed spring in the form of a bar of a material having a predetermined natural frequency of vibration and having one end thereof responsive to magnetic attraction; means for rigidly holding the other end of said bar against movement while leaving said one end of the bar unsupported; electrically energized means for generating a magnetic field adjacent to said one end of the bar for attracting said one end of the bar and flexing the bar into a stressed condition within its elastic limits to store in the bar potential energy, which upon each de-energization of the electrically energized means to release said one end of the bar, is converted into kinetic energy for initiating a single cycle of vibration of said one unsupported end of the bar at the natural frequency thereof, said electrically energized means being re-energized within one cycle of vibration of said bar to re-stress said bar in the same cycle in which it was released; and a record marking member connected to the bar adjacent to said one end for direct actuation by the bar upon release of the magnetic field.

4. A signal responsive recording apparatus comprising a plurality of bars of a material having a predetermined natural frequency of vibration and each having one end thereof responsive to magnetic attraction, means for rigidly holding the opposite ends of said bars against movement while leaving said one end of the bars unsupported, normally energized signal controlled means for generating magnetic fields adjacent to said one end of said bars for individually flexing the bars into a stressed condition within their elastic limits to store potential energy in the bars, which upon release of their magnetic fields by their de-energization in response to received signals at a rate substantially the same as the natural frequency of vibration of the bars is converted into kinetic energy for initiating single cycles of vibration of said bars at the natural frequency thereof upon receipt of a signal, and record marking means actuated by said bars to make a discrete record mark on each cycle of vibration thereof in response to de-energization of the signal controlled means and re-energization thereof within said cycle.

5. A perforator for punching permutation code perforations in tape comprising a punch block, a plurality of punches mounted in said punch block for reciprocation in said punch block, means for intermittently feeding tape through said punch block in timed relation to the reciprocation of said punches, a link individual to each punch, a plurality of metal reed springs in the form of bars having a predetermined natural frequency of vibration and having one end thereof responsive to magnetic attraction, one of said bars being connected to each one of said links for actuating said links, a plurality of electromagnets one individual to each bar, a framework for supporting said electromagnets, means on said framework for rigidly holding the ends of said bars remote from their point of connection to the links and for holding said bars in proximity to their associated electromagnets, said bars forming the armatures of said electromagnets whereby upon energization of an electromagnet its associated reed spring will have its end responsive to magnetic attraction attracted to its electromagnet and will be bent to a stressed condition within its elastic limits to store in the bar potential energy which upon release by its electromagnet will be converted into kinetic energy for initiating a single cycle of vibration of the end of the bar having a link connected to it at the natural frequency thereof to drive its associated punch through the tape, and means for de-energizing and re-energizing said electromagnets within a time interval equal to one cycle of vibration of a bar at its natural frequency.

6. A tape perforator comprising a bar of magnetic material having a predetermined natural frequency of vibration, means for rigidly holding one end of said bar against movement while leaving the other end of the bar unsupported, electrically energizable means for generating a magnetic field adjacent to said other end of the bar for attracting said other end of the bar and flexing the bar into a stressed condition within its elastic limits to store in the bar potential energy which upon release of said magnetic field, to release the bar, is converted into kinetic energy for initiating vibration of the unsupported end of the bar at the natural frequency thereof, a punch connected to said other end of the bar for direct actuation thereby upon release of the magnetic field, a die positioned in alignment with said punch, means for both de-energizing and re-energizing said energizable means at a rate of speed within a single cycle of vibration of the bar at its natural frequency, and means also actuated by said other end of the bar for feeding tape into position between the punch and the die.

7. In a machine for selectively marking a record, an electromagnet, a bar of paramagnetic material having one end fixed and the free end positioned to be attracted by the magnet, a marking element connected to the free end of said bar and spaced from said record, means for energizing said magnet to stress said bar to store sufficient potential energy in bar to move said marking element into said engagement with said record, said stressing of said bar moving said marking element away from said record, and means for de-energizing said magnet to convert the potential energy into kinetic energy to move said marking element into engagement with said record.

References Cited in the file of this patent

UNITED STATES PATENTS

| | | |
|---|---|---|
| 388,333 | Barnard | Aug. 21, 1888 |
| 946,024 | Ehrhardt | Jan. 11, 1910 |
| 953,180 | Roberts et al. | Mar. 29, 1910 |
| 1,920,479 | Poole | Aug. 1, 1933 |
| 2,214,522 | Chappell et al. | Sept. 10, 1940 |
| 2,999,632 | Tailleur | Sept. 12, 1961 |